United States Patent
Suthar et al.

(10) Patent No.: US 11,206,593 B2
(45) Date of Patent: Dec. 21, 2021

(54) OPTIMIZING SERVING GATEWAY SELECTION DURING INTER—MOBILITY MANAGEMENT ENTITY MOBILITY SCENARIOS

(71) Applicant: Cisco Technology, Inc., San Jose, CA (US)

(72) Inventors: Om Prakash Suthar, Bolingbrook, IL (US); Ryo Watanabe, Tokyo (JP); Aeneas Sean Dodd-Noble, Andover, MA (US); Raghavendra Suryanarayanarao Vidyashankar, Bangalore South (IN); Vivek Agarwal, Chelmsford, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/790,078

(22) Filed: Feb. 13, 2020

(65) Prior Publication Data
US 2021/0258846 A1 Aug. 19, 2021

(51) Int. Cl.
*H04W 36/00* (2009.01)
*H04W 36/12* (2009.01)
*H04W 8/24* (2009.01)

(52) U.S. Cl.
CPC ............ *H04W 36/12* (2013.01); *H04W 8/245* (2013.01)

(58) Field of Classification Search
CPC . H04W 36/12; H04W 8/245; H04M 1/72519; H04M 1/72522
USPC ........................ 370/331, 310.2; 455/436, 439
See application file for complete search history.

(56) References Cited

U.S. PATENT DOCUMENTS

| | | | |
|---|---|---|---|
| 10,951,575 B1* | 3/2021 | Bertz | H04L 61/3075 |
| 2012/0282017 A1* | 11/2012 | Uttley | A63H 33/107 403/188 |
| 2016/0095036 A1* | 3/2016 | Stojanovski | H04W 88/16 370/331 |
| 2017/0280340 A1* | 9/2017 | Zhu | H04W 24/04 |
| 2018/0091154 A1* | 3/2018 | Ooi | H03K 19/17728 |
| 2019/0007984 A1* | 1/2019 | Kuroda | H04W 76/10 |

(Continued)

OTHER PUBLICATIONS

3GPP, "3rd Generation Partnership Project; Technical Specification Group Core Network and Terminals; Numbering, addressing and identification (Release 16)", 3GPP TS 23.003 V16.1.0, Dec. 2019, 139 pages.

(Continued)

*Primary Examiner* — Danh C Le
(74) *Attorney, Agent, or Firm* — Edell, Shapiro & Finnan, LLC

(57) ABSTRACT

In one example, an indication that a user equipment participating in a Packet Data Network (PDN) session hosted by a Serving Gateway (SGW) and a PDN Gateway (PGW) is transitioning from a first Mobility Management Entity (MME) to a second MME is obtained. An indication that the SGW is co-located with the PGW and an identification of the SGW are obtained. Based on the indication that the SGW is co-located with the PGW and the identification of the SGW, it is determined that the SGW is reachable from the second MME. In response to determining that the SGW is reachable from the second MME, the SGW is selected to host the PDN session after the user equipment transitions from the first MME to the second MME.

20 Claims, 8 Drawing Sheets

(56) References Cited

U.S. PATENT DOCUMENTS

| | | | |
|---|---|---|---|
| 2019/0223076 A1 | 7/2019 | Albasheir et al. | |
| 2019/0246328 A1* | 8/2019 | Qiao | H04W 36/00837 |
| 2019/0327653 A1* | 10/2019 | Jin | H04W 36/03 |
| 2020/0404542 A1* | 12/2020 | Jing | H04W 76/11 |

OTHER PUBLICATIONS

EventStudio System Designer 6, "LTE S1 Handover (S1 Handover)", Feb. 17, 2014, 5 pages.

Panigrahi, Prashant, "LTE Tracking Area Update Call Flow Procedure", Jun. 22, 2017, 8 pages.

3GPP, "3rd Generation Partnership Project; Technical Specification Group Core Network and Terminals; Domain Name System Procedures; Stage 3 (Release 16)", 3GPP TS 29.303 V16.1.0, Dec. 2019, 79 pages.

3GPP, "3rd Generation Partnership Project; Technical Specification Group Core Network and Terminals; Interface between the Control Plane and the User Plane Nodes; Stage 3 (Release 16)", 3GPP TS 29.244 V16.2.0, Dec. 2019, 281 pages.

3GPP, "3rd Generation Partnership Project; Technical Specification Group Services and System Aspects; Architecture enhancements for control and user plane separation of EPC nodes; Stage 2 (Release 16)", 3GPP TS 23.214 V16.0.0, Jun. 2019, 92 pages.

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16)", 3GPP TS 29.274 V16.2.0, Dec. 2019, 402 pages.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.5.0, Dec. 2019, 436 pages.

Nokia et al., "Support of RACS in PLMNs with distributed and -non coordinated filtering of UE radio capabilities", 3GPP TSG-SA WG2 Meeting #134, S2-1907057, Jun. 5, 2019, 68 pages.

Nokia et al., "Selection mechanism for UP entity", S2-163658, Jul. 11-15, 2016, 3GPP, SA WG2 TD, 4 pages.

Huawei et al., "SGW Selection during TAU", 3GPP TSG CT WG4 Meeting #42, C4-090978, Feb. 9-19, 2009, 7 pages.

Nokia et al., "Pseudo-CR on CP and UP selection functions", 3GPP TSG CT4 Meeting #74, 3GPP TR 29.8de v0.0.0, C4-164047, Jul. 25-29, 2016, 10 pages.

International Search Report and Written Opinion in counterpart International Application No. PCT/US2021/017068, dated May 11, 2021, 17 pages.

* cited by examiner

OPTIMIZING SERVING GATEWAY SELECTION DURING INTER—MOBILITY MANAGEMENT ENTITY MOBILITY SCENARIOS

TECHNICAL FIELD

The present disclosure relates to telecommunications technology.

BACKGROUND

A fourth generation (4G) core network, also referred to as the Evolved Packet Core (EPC), provides network connectivity between a User Equipment (UE), such as a mobile phone, and a Packet Data Network (PDN), such as the Internet. The EPC includes several network entities such as a Mobility Management Entity (MME), Serving Gateway (SGW), and PDN Gateway (PGW). The MME manages session states, authentication, paging, mobility, roaming, and other bearer management functions. The SGW resides in the user plane, and forwards and routes packets to and from the eNodeB and PGW. The PGW acts as an interface between the EPC and PDN. In a Control and User Plane Separation (CUPS) EPC architecture, the SGW and PGW are each separated into control plane components (e.g., SGW-C and PGW-C) and user plane components (e.g., SGW-U and PGW-U). CUPS EPC architecture permits independent scalability and control of the control plane and the user plane.

DESCRIPTION OF EXAMPLE EMBODIMENTS

Overview

In one example embodiment, an indication that a user equipment participating in a Packet Data Network (PDN) session hosted by a Serving Gateway (SGW) and a PDN Gateway (PGW) is transitioning from a first Mobility Management Entity (MME) to a second MME is obtained. An indication that the SGW is co-located with the PGW and an identification of the SGW are obtained. Based on the indication that the SGW is co-located with the PGW and the identification of the SGW, it is determined that the SGW is reachable from the second MME. In response to determining that the SGW is reachable from the second MME, the SGW is selected to host the PDN session after the user equipment transitions from the first MME to the second MME.

EXAMPLE EMBODIMENTS

Figure 1:
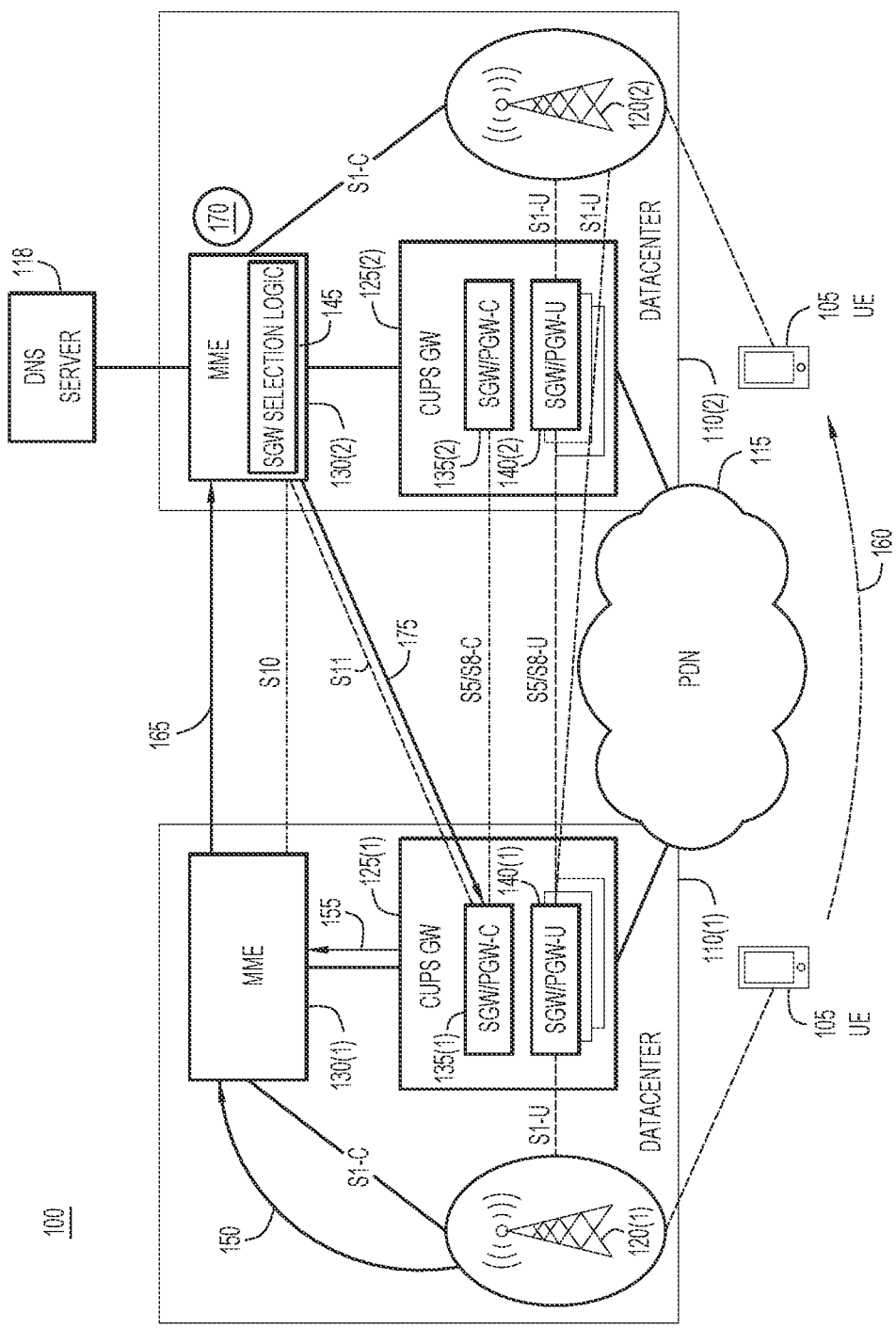
FIG. 1 illustrates a system for optimizing Serving Gateway (SGW) selection during inter-Mobility Management Entity (MME) mobility scenarios, according to an example embodiment.

FIG. 1 illustrates an example system 100 for optimizing Serving Gateway (SGW) selection during inter—Mobility Management Entity (MME) mobility scenarios in a fourth generation (4G) network. System 100 includes User Equipment (UE) 105, datacenter 110(1), datacenter 110(2), Packet Data Network (PDN) 115, and Domain Name System (DNS) server 118. Datacenter 110(1) includes eNodeB 120(1), Control and User Plane Separation (CUPS) Gateway (GW) 125(1), and Mobility Management Entity (MME) 130(1). CUPS GW 125(1) further includes an SGW and a PDN GW (PGW) which are each separated into co-located control plane components (SGW-C and PGW-C, or collectively SGW/PGW-C 135(1)) and user plane components (e.g., SGW-U and PGW-U, or collectively SGW/PGW-U 140(1)). Similarly, datacenter 110(2) includes eNodeB 120(2), CUPS GW 125(2), and MME 130(2). CUPS GW 125(2) further includes an SGW and a PGW which are each separated into co-located control plane components (SGW-C and PGW-C, or collectively SGW/PGW-C 135(2)) and user plane components (e.g., SGW-U and PGW-U, or collectively SGW/PGW-U 140(2)). DNS server 118 may be configured to translate domain names to Internet Protocol (IP) addresses.

eNodeB 120(1) is configured to communicate with SGW/PGW-U 140(1) over an S1-U interface and with MME 130(1) over an S1-C interface. eNodeB 120(2) is configured to communicate with SGW/PGW-U 140(2) over an S1-U interface and with MME 130(2) over an S1-C interface. eNodeB 120(2) is further configured to communicate with SGW/PGW-U 140(1) over an S1-U interface. SGW/PGW-C 135(1) is configured to communicate with MME 130(2) over an S11 interface. MME 130(1) and MME 130(2) may communicate with each other over an S10 interface; SGW/PGW-C 135(1) and SGW/PGW-C 135(2) may communicate with each other over an S5/S8-C interface; and SGW/PGW-U 140(1) and SGW/PGW-C 140(2) may communicate with each other over an S5/S8-U interface.

It will be appreciated that while system 100 includes datacenters 110(1) and 110(2), techniques described herein may be implemented in a single datacenter, or in multiple datacenters. Other embodiments may also be envisioned. MMES 130(1) and 130(2) may be located at the same site or different sites, and may be part of the same MME pool. It will be appreciated that any number of UEs and/or other network entities may be present in system 100.

UE 105 may be associated with any suitable device configured to initiate a flow in system 100. For example, UE 105 may include a computer, a vehicle and/or any other transportation-related device having electronic devices configured thereon, an automation device, an enterprise device, an appliance, an Internet of Things (IoT) device, a Personal Digital Assistant (PDA), a laptop or electronic notebook, a cellular telephone, a smartphone, a tablet, an IP phone, and/or any other device and/or combination of devices, components, elements, and/or objects capable of initiating voice, audio, video, media, or data exchanges within system 100. UE 105 may also include any suitable interface to a human user such as a microphone, a display, a keyboard, or other terminal equipment. UE 105 may also be any device that seeks to initiate a communication on behalf of another entity or element such as a program, a database, or any other component, device, element, or object capable of initiating an exchange within system 100. UE 105 may be configured with appropriate hardware (e.g., processor(s), memory element(s), antennas and/or antenna arrays, baseband processors (modems), and/or the like), software, logic, and/or the like to facilitate respective over-the-air (air) interfaces for accessing/connecting to eNodeBs 120(1) and 120(2).

eNodeBs 120(1) and 120(2) may originate and terminate a cellular (e.g., 4G Long-Term Evolution (LTE)) air interface and may be configured with appropriate hardware (e.g., processor(s), memory element(s), antennas and/or antenna arrays, baseband processors (modems), and/or the like), software, logic, and/or the like to provide over-the-air coverage for a cellular access network. eNodeBs 120(1) and 120(2) may comprise respective virtual Radio Access Networks (vRANs). Each eNodeBs 120(1) and 120(2) may be associated with respective Tracking Area Codes (TACs) which identify a given tracking area to which eNodeBs 120(1) and 120(2) provide coverage. A tracking area which may be logical or geographic areas in which UE 105 may move without transitioning from MME 130(1).

In various embodiments, PDN 115 provides logical connectivity from UE 105 to CUPS GW 125(1) to enable connection to an external data network. PDN 115 may be used for any suitable service such as Internet, an IP Multimedia Subsystem (IMS), Ethernet network, Ethernet switching system(s), and/or the like. PDN 115 may facilitate user plane (e.g., user data/data transfer) connectivity for one or more PDN sessions (e.g., one or more subscriber sessions). For example, UE 105 may participate in a PDN session to access various services, applications, etc. from PDN 115.

In this example, UE 105 is initially connected to eNodeB 120(1) and is participating in a PDN session hosted by CUPS GW 125(1) and MME 130(1). When an inter-MME mobility scenario arises, UE 105 may be prompted to transition from MME 130(1) to MME 130(2). One example of an inter-MME mobility scenario is a Tracking Area Update (TAU) procedure, whereby the tracking area of UE 105 changes, thereby prompting UE 105 to transition between MMES. In this example, UE 105 leaves a tracking area associated with eNodeB 120(1) and enters a tracking area associated with eNodeB 120(2). Accordingly, UE 105 transitions from eNodeB 120(1) (and MME 130(1)) to eNodeB 120(2) (and MME 130(2)).

Another example of an inter-MME mobility scenario is an S1 Handover (S1-HO), in which an X2 interface between eNodeBs 120(1) and 120(2) is unavailable. In this situation, UE 105 transitions from eNodeB 120(1) to eNodeB 120(2), and because the X2 interface is unavailable to help facilitate the handover, an S1-HO is used instead whereby UE 105 also transitions from MME 130(1) to MME 130(2). Because UE 105 is transitioning from MME 130(1) to MME 130(2), MME 130(1) may also be referred to as an "old MME" and MME 130(2) may be referred to as a "new MME."

Conventionally, during an inter-MME mobility scenario, the PGW would remain the same, but the SGW would change. For example, MME 130(2) would permit the PGW of CUPS GW 125(1) to continue to host the PDN session but select the SGW of CUPS GW 125(2) to host the PDN session. This would create a split session, in both the control and user planes, wherein the PGW-C and the PGW-U of CUPS GW 125(1) host the PDN session with the SGW-C and the SGW-U of CUPS GW 125(2). Notably, the PGW-C and the PGW-U of CUPS GW 125(1) are not co-located with the SGW-C and the SGW-U of CUPS GW 125(2). This would generate unwanted signaling/user-plane hopping over the S5/S8-C and S5/S8-U interfaces between CUPS GW 125(1) and CUPS GW 125(2), which would lead to operational complexities and latency in system 100. Thus, the SGW relocation decision/selection that would be made by MME 130(2) in conventional approaches would cause suboptimal signaling and data paths for the ongoing PDN session.

In accordance with techniques described herein, MME 130(2) may be configured with SGW selection logic 145, which causes MME 130(2) to perform operations described herein with respect to optimizing SGW selection during inter-MME mobility scenarios. In one example, at 150, a PDN session is established for UE 105 through an initial PDN connection for a PDN session. The PDN session is hosted by the PGW of CUPS GW 125(1) and the SGW of CUPS GW 125(1). At 155, MME 130(1) obtains an indication, from CUPS GW 125(1), that the SGW of CUPS GW 125(1) is co-located with the PGW of CUPS GW 125(1) during the initial PDN connection of UE 105. In one example, the indication may be obtained by MME 130(1) in an Information Element (IE) (e.g., an indication flag) referred to as a Co-located CUPS GW Indication (CCGWI). The CCGWI may be inserted in a General Packet Radio Services (GPRS) Tunneling Protocol version 2 for Control plane (GTPv2-C) Create Session Response message. The CCGWI may be set to '1' to indicate that the SGW of CUPS GW 125(1) is co-located with the PGW of CUPS GW 125(1) (e.g., that one or more PDN sessions are assigned to the PGW of CUPS GW 125(1) and the SGW of CUPS GW 125(1)). Thus, the CCGWI (flag) can be set to '1' if a PDN session is established with a co-located CUPS GW. The CCGWI (flag) can be exchanged between MMES during various inter-MME mobility scenarios such as TAU scenarios and S1 Handover scenarios.

In one example, the CCGWI may be further provided by MME 130(1) to MME 130(2). Consider, at 160, an inter-MME mobility scenario which occurs whereby UE 105 moves from a coverage area of eNodeB 120(1) to a coverage area of eNodeB 120(2). At 165, MME 130(2) obtains, from MME 130(1) via the S10 interface, subscriber session and context information including an indication that UE 105 is transitioning from MME 130(1) to MME 130(2) (e.g., due to the inter-MME mobility scenario). MME 130(2) may further obtain, from MME 130(1), an indication that the SGW of CUPS GW 125(1) is co-located with the PGW of CUPS GW 125(1). The indication may be a CCGWI inserted in a GTPv2-C Context Response message during a TAU procedure, or inserted in a GTPv2-C Forward Relocation Request during an S1-HO. The CCGWI may be set to '1' to indicate that the SGW of CUPS GW 125(1) is co-located with the PGW of CUPS GW 125(1). MME 130(2) may also obtain, from MME 130(1), an identification of the SGW of CUPS GW 125(1). The identification of the SGW may be an IP address, such as an IP version 4 (IPv4) address or IP version 6 (IPv6) address.

At 170, based on the indication that the SGW of CUPS GW 125(1) is co-located with the PGW of CUPS GW 125(1), and the identification of the SGW of CUPS GW 125(1), MME 130(2) may determine that the SGW of CUPS GW 125(1) is reachable from MME 130(2). For example, MME 130(2) may obtain one or more identifications of candidate SGWs that are reachable from MME 130(2) from DNS server 118, and determine that one of the one or more identifications of candidate SGWs matches the identification of the SGW. In response, MME 130(2) may select the SGW of CUPS GW 125(1) to host the PDN session after UE 105 transitions from MME 130(1) to MME 130(2). At 175, MME 130(2) re-establishes a tunnel with the SGW of CUPS GW 125(1), thereby keeping the PDN context/session intact.

These techniques may enable MME 130(2) to effectively skip conventional SGW relocation procedures and allow the PDN session to continue to be hosted by the SGW of CUPS GW 125(1). MMES 130(1) and 130(2) may be notified that the PDN session is hosted on CUPS GW 125(1), and MME 130(2) may ensure that the PDN session is continued to be hosted by the SGW of CUPS GW 125(1) and the PGW of CUPS GW 125(1) for optimized behavior. For example, MME 130(2) may avoid performing conventional SGW relocation during an inter-MME mobility scenario in order to prevent extra signaling and data path hops that would occur in conventional approaches, thereby providing signaling benefits while enriching user experience during inter-MME mobility scenarios.

Figure 2:
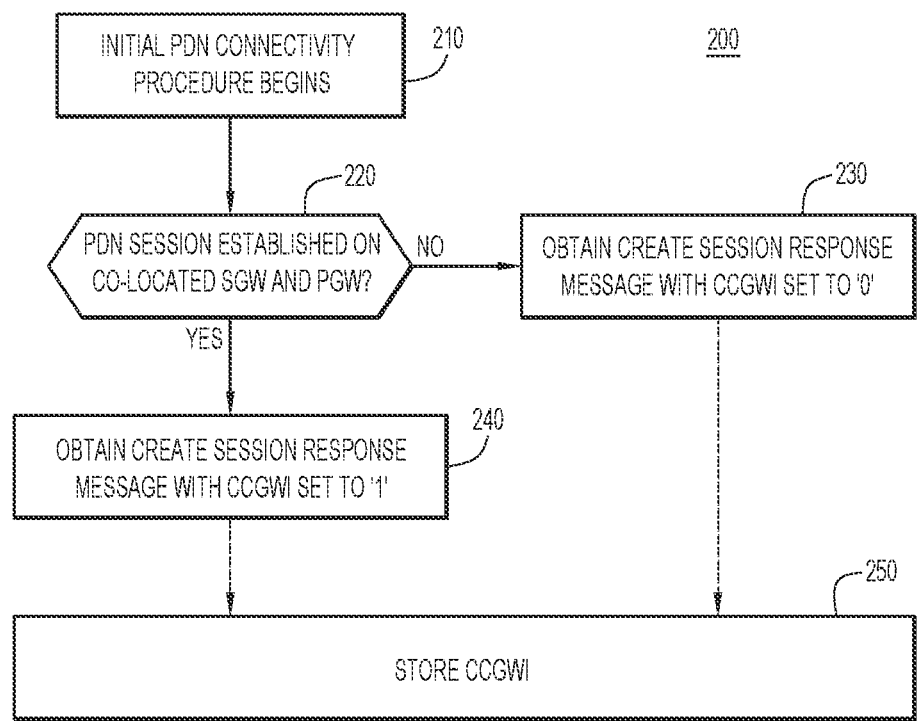
FIG. 2 illustrates a flowchart of a method for determining whether an SGW is co-located with a Packet Data Network (PDN) Gateway (PGW) during an initial PDN connectivity procedure, according to an example embodiment.

FIG. 2 illustrates a flowchart of an example method 200 for determining whether an SGW is co-located with a PGW during an initial PDN connectivity procedure (e.g., before any inter-MME mobility scenario arises). The initial PDN connectivity procedure may establish an initial PDN connection for a PDN session. At 210, the initial PDN connectivity procedure (e.g., attach procedure) begins. At 220, a CUPS GW node (e.g., CUPS GW 125(1)) determines whether the PDN session has been established on a co-located SGW and PGW. If not, the CUPS GW node generates a GTPv2-C Create Session Response message with a CCGWI set to '0' to indicate that the SGW is not co-located with the PGW, and sends the GTPv2-C Create Session Response message to an MME (e.g., MME 130(1)). At 230, the MME obtains the GTPv2-C Create Session Response message, with the CCGWI set to '0', from the CUPS GW node. If so, the CUPS GW node generates a GTPv2-C Create Session Response message with a CCGWI set to '1' to indicate that the SGW is co-located with the PGW, and sends the GTPv2-C Create Session Response message to the MME. At 240, the MME obtains the GTPv2-C Create Session Response message, with the CCGWI set to '1', from the CUPS GW node. The MME may obtain the GTPv2-C Create Session Response message from the SGW-C based on the CUPS GW node selected for the PDN session. At 250, the MME stores the CCGWI (e.g., '0' or '1') in a subscriber session database record.

Figure 3:
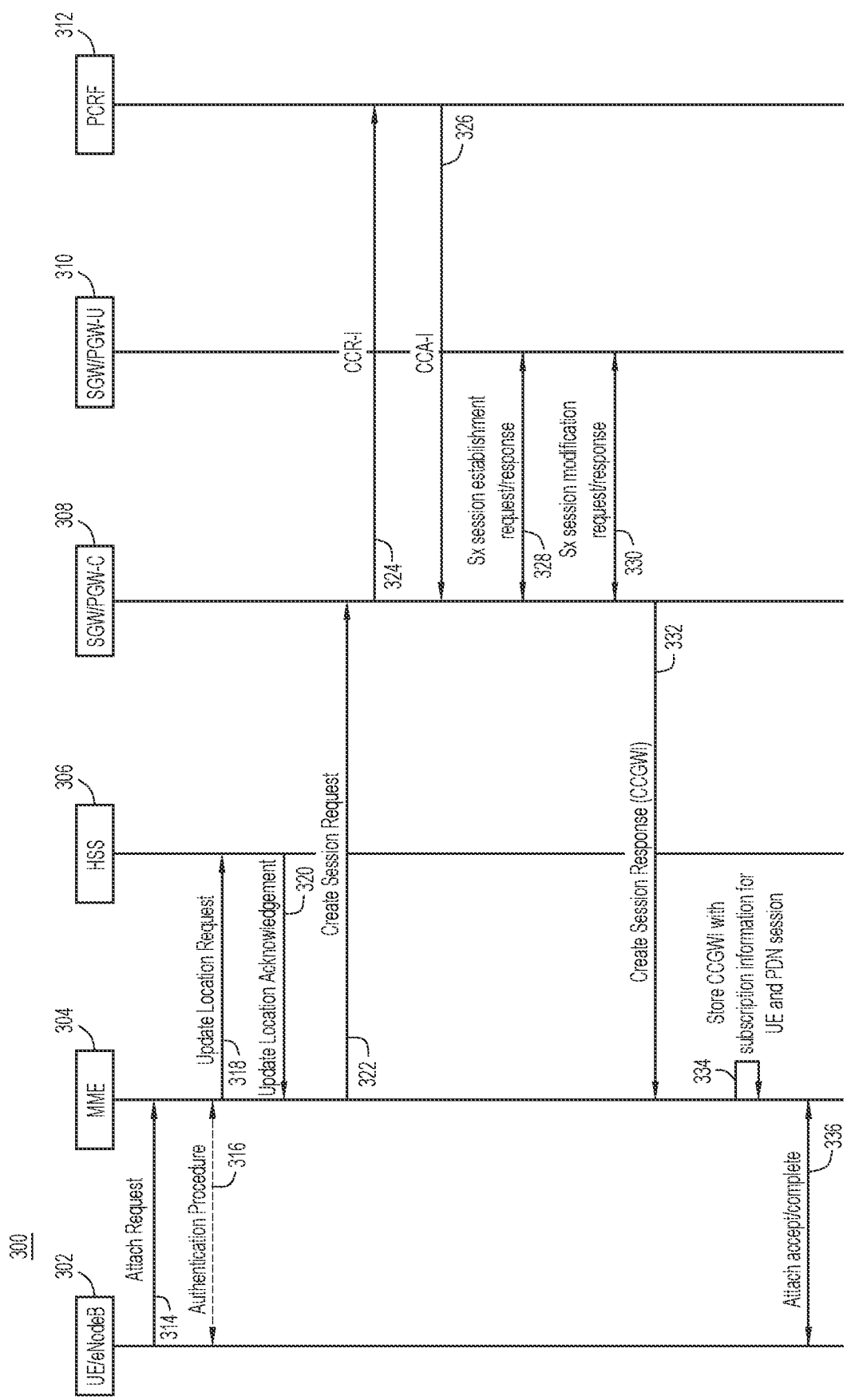
FIG. 3 illustrates a flow diagram of a method for determining whether an SGW is co-located with a PGW during an initial PDN connectivity procedure, according to an example embodiment.

FIG. 3 illustrates a flow diagram of an example method 300 for determining whether an SGW is co-located with a PGW during an initial PDN connectivity procedure. Method 300 involves a UE and an eNodeB, collectively referred to as "UE/eNodeB," 302 (e.g., UE 105 and eNodeB 120(1)); MME 304 (e.g., MME 130(1)); Home Subscriber Server (HSS) 306; SGW/PGW-C 308 (e.g., SGW/PGW-C 135(1)); SGW/PGW-U 310 (e.g., SGW/PGW-U 140(1)); and Policy and Charging Rules Function (PCRF) 312.

At 314, MME 304 receives an attach request from UE/eNodeB 302. At 316, MME 304 successfully authenticates the UE via any suitable authentication procedure. At 318, MME 304 sends an update location request to HSS 306. At 320, MME 304 receives an update location acknowledgment from HSS 306. At 322, MME 304 sends a Create Session Request to SGW/PGW-C 308. At 324, SGW/PGW-C 308 sends an Initial Credit Control Request (CCR-I) to PCRF 312, and at 326, SGW/PGW-C 308 receives an Initial Credit Control Answer (CCA-I) from PCRF 312. At 328, SGW/PGW-C 308 and SGW/PGW-U 310 exchange Sx session establishment request/response messages. At 330, SGW/PGW-C 308 and SGW/PGW-U 310 exchange Sx session modification request/response messages.

At 332, MME 304 receives a GTPv2-C Create Session Response from SGW/PGW-C 308. The GTPv2-C Create Session Response message includes the CCGWI. If bearers are established on a co-located SGW and PGW, the CCGWI is set to '1'. If bearers are not established on a co-located SGW and PGW, the CCGWI is set to '0'. Thus, the CCGWI in the GTPv2-C Create Session Response indicates to MME 304 whether the SGW is co-located with the PGW. At 334, based on the Create Session Response, MME 304 stores the CCGWI with the subscription information for the UE and PDN session. Thus, MME 304 may associate the UE and PDN session with the CCGWI. MME 304 may maintain any number of associations of CCGWIs/UEs/PDN sessions (e.g., in a common/shared database). At 336, UE/eNodeB 302 and MME 304 accept/complete the attach procedure.

Figure 4:
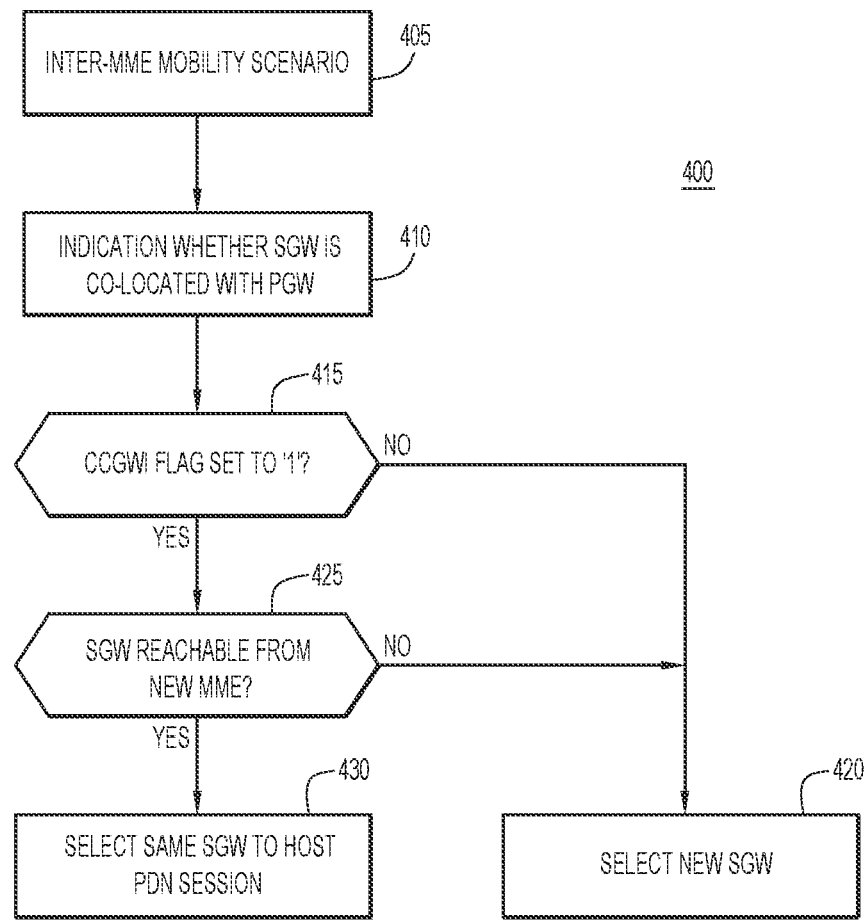
FIG. 4 illustrates a flowchart of a method for optimizing SGW selection during inter-MME mobility scenarios, according to an example embodiment.

FIG. 4 illustrates a flowchart of an example method 400 for optimizing SGW selection during inter-MME mobility scenarios. At 405, a UE begins an inter-MME mobility scenario whereby the UE transitions from an old MME (e.g., a first MME such as MME 130(1)) to a new MME (e.g., a second MME such as MME 130(2)). At 410, the new (second) MME obtains, from the old (first) MME, an indication whether the SGW that previously hosted the PDN session is co-located with the PGW. The indication may be a CCGWI inserted in a GTPv2-C Context Response message during a TAU procedure, or inserted in a GTPv2-C Forward Relocation Request during an S1-HO. The indication may include an identification of the SGW (e.g., an SGW IP address of the SGW).

At 415, the MME determines whether the CCGWI flag is set to '1'. If the CCGWI flag is not set to '1' (e.g., set to '0'), at 420 the MME selects a new SGW based on the Name Authority Pointer (NAPTR) record preference/order. If the CCGWI flag is set to '1', at 425 the new (second) MME determines whether the SGW is reachable from the new (second) MME. In one example, the new (second) MME may construct a Tracking Area Identity (TAI) Fully Qualified Domain Name (FQDN) associated with the tracking area of the new eNodeB, and send a DNS NAPTR query that includes the TAI FQDN to a DNS server (e.g., DNS server 118). The DNS server may provide a DNS answer/response that includes one or more identifications of candidate SGWs that are reachable from the new (second) MME (e.g., a list of one or more IP addresses of the candidate SGWs). The new (second) MME may determine whether one of the one or more identifications of candidate SGWs matches the identification of the SGW. For example, the new (second) MME may determine whether the IP address of the SGW received from the old (first) MME matches one of the IP addresses received from the DNS server. If the SGW is not reachable from the new (second) MME, at 420 the new (second) MME selects a new SGW from the candidate SGWs for the TAI FQDN based on the NAPTR record preference/order. If the SGW is reachable from the new (second) MME (e.g., if the IP address of the SGW received from the old (first) MME matches one of the IP addresses received from the DNS server), at 430 the new (second) MME selects the same SGW to host the PDN session after the UE transitions from the old (first) MME to the new (second) MME. Thus, the new (second) MME avoids selecting a new SGW (e.g., performs no SGW relocation/reselection for this call), and the PDN session is kept intact with the CUPS GW.

Figure 5:
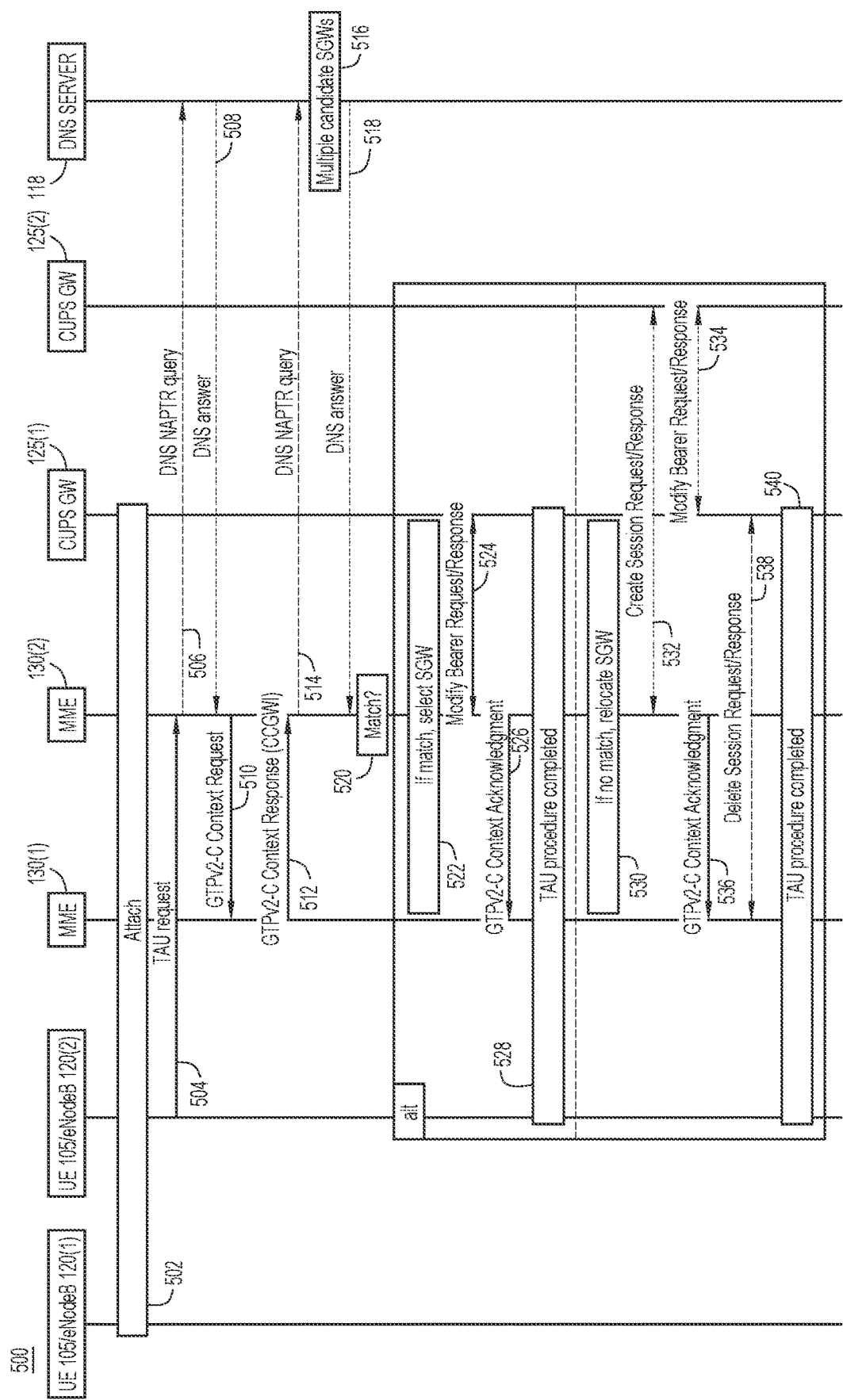
FIG. 5 illustrates a flow diagram of a method for optimizing SGW selection during an inter-MME tracking area update procedure, according to an example embodiment.

FIG. 5 illustrates a flow diagram of an example method 500 for optimizing SGW selection during a TAU procedure. Reference is also made to FIG. 1. In particular, FIG. 5 shows various communications occurring between UE 105/eNodeB 120(1), UE 105/eNodeB 120(2), (first) MME 130(1), (second) MME 130(2), CUPS GW 125(1), CUPS GW 125(2) (e.g., the SGW of CUPS GW 125(2)), and DNS server 118.

Initially, at 502, the subscriber (e.g., UE 105) is attached via MME 130(1) and CUPS GW 125(1). At 504, MME 130(2) obtains an indication, from UE 105/eNodeB 120(2), that UE 105 is transitioning from MME 130(1) to MME 130(2). The indication may be a TAU request that includes a Globally Unique Temporary Identifier (GUTI) for UE 105 and a TAI corresponding to eNodeB 120(1). At 506, MME 130(2) sends, to DNS server 118, a DNS NAPTR query including the FQDN of MME 130(1) to resolve the IP address of MME 130(1). At 508, MME 130(2) receives, from DNS server 118, a DNS answer that includes the IP address of MME 130(1). The DNS answer may also include the service type of MME 130(1) (e.g., S10).

At 510, MME 130(2) sends a GTPv2-C Context Request to MME 130(1). At 512, MME 130(2) obtains a GTPv2-C Context Response from MME 130(1). The GTPv2-C Context Response may include an indication that the SGW of CUPS GW 125(1) is co-located with the PGW of CUPS GW 125(1) (e.g., a CCGWI set to '1'). Thus, the CCGWI can be set to '1' for the inter-MME TAU procedure over the S10 interface in which the CCGWI is signaled to MME 130(2) for optimized co-located CUPS GW node selection (if possible). The GTPv2-C Context Response may also include EPS (Evolved Packet System) Mobility Management (EMM) and EPS Session Management (ESM) context information such as an identification of the SGW (e.g., SGW-C) and PGW (e.g., PGW-C) of CUPS GW 125(1) (e.g., a Fully Qualified Tunnel Endpoint Identifier (F-TEID) including an IP address of the SGW and PGW of CUPS GW 125(1)). At 514, MME 130(2) sends a DNS NAPTR query that includes the TAI FQDN of eNodeB 120(2) to DNS server 118 to resolve one or more IP addresses of one or more SGWs based on the TAI FQDN. At 516, DNS server 118 determines that multiple candidate SGWs are reachable from MME 130(2) for the TAI. At 518, MME 130(2) obtains, from DNS server 118, a DNS answer including identifications (e.g., IP addresses) of the candidate SGWs.

At 520, MME 130(2) determines whether one of the IP addresses of the candidate SGWs matches the IP address of the SGW of CUPS GW 125(1) (e.g., whether the SGW is reachable from MME 130(2)). Operations 522-528 are performed if MME 130(2) determines that one of the IP addresses of the candidate SGWs matches the IP address of the SGW of CUPS GW 125(1), and operations 530-540 are performed if MME 130(2) determines that one of the IP addresses of the candidate SGWs does not match the IP address of the SGW of CUPS GW 125(1).

Turning first to operations 522-528, if MME 130(2) determines that one of the IP addresses of the candidate SGWs matches the IP address of the SGW of CUPS GW 125(1), at 522 MME 130(2) selects the SGW of CUPS GW 125(1) to host the PDN session after UE 105 transitions from MME 130(1) to MME 130(2). That is, MME 130(2) avoids SGW relocation and both PGW-C and SGW-C calls are kept intact in CUPS GW 125(1). At 524, MME 130(2) and CUPS GW 125(1) exchange Modify Bearer Request/Response messages. The Modify Bearer Request may update the F-TEID, and may include the IP address of the SGW of CUPS GW 125(1) and other information. At 526, MME 130(2) sends a GTPv2-C Context Acknowledgment/Forward to MME 130(1). The GTPv2-C Context Acknowledgment may include a SGW Change Indication (SGWCI) indicator flag set to '0' to indicate that the SGW for the PDN session is not changing. At 528, the TAU procedure is completed, and the PDN session is retained in CUPS GW 125(1).

If MME 130(2) determines that none of the IP addresses of the candidate SGWs match the IP address of the SGW of CUPS GW 125(1), at 530 MME 130(2) performs SGW relocation by selecting the SGW of CUPS GW 125(2) to host the PDN session after UE 105 transitions from MME 130(1) to MME 130(2). That is, a session split is created whereby the PDN session is hosted by the PGW-C and PGW-U of CUPS GW 125(1), and by the SGW-C and SGW-U of CUPS GW 125(2). At 532, MME 130(2) and CUPS GW 125(2) exchange Create Session Request/Response messages. At 534, CUPS GW 125(1) and CUPS GW 125(2) exchange Modify Bearer Request/Response messages. At 536, MME 130(2) sends a GTPv2-C Context Acknowledgment to MME 130(1). The GTPv2-C Context Acknowledgment may include a SGWCI indicator flag set to '1' to indicate that the SGW for the PDN session is changing. At 538, MME 130(1) and CUPS GW 125(1) exchange Delete Session Request/Response messages to delete the existing SGW session. At 540, the TAU procedure is completed, and the SGW-C and PGW-C sessions are split across CUPS GWs 125(1) and 125(2).

Figure 6:
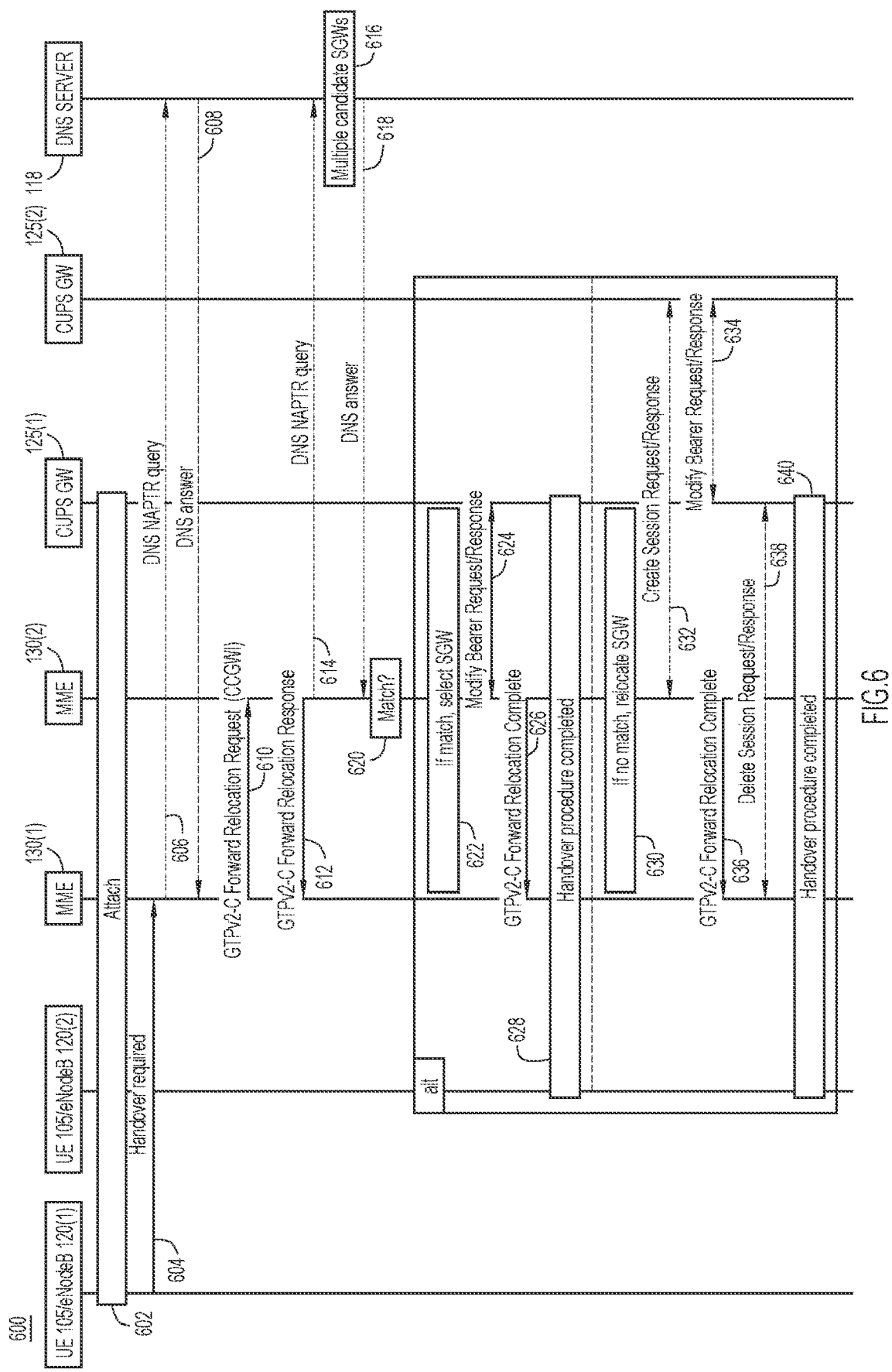
FIG. 6 illustrates a flow diagram of a method for optimizing SGW selection during an inter-MME handover procedure, according to an example embodiment.

With continued reference to FIG. 1, FIG. 6 illustrates a flow diagram of an example method 600 for optimizing SGW selection during an S1-HO procedure. FIG. 6 shows various communications occurring between UE 105/eNodeB 120(1), UE 105/eNodeB 120(2), (first) MME 130(1), (second) MME 130(2), CUPS GW 125(1), CUPS GW 125(2) (e.g., the SGW of CUPS GW 125(2)), and DNS server 118.

Initially, at 602, the subscriber (e.g., UE 105) is attached via MME 130(1) and CUPS GW 125(1). At 604, MME 130(1) obtains an indication, from UE 105/eNodeB 120(2), that UE 105 is transitioning from MME 130(1) to MME 130(2). The indication may be an indication that a handover (e.g., S1-HO) is required. The indication may specify eNodeB 120(2) as the target eNodeB and include the TAC associated with eNodeB 120(2). At 606, MME 130(1) sends, to DNS server 118, a DNS NAPTR query including the TAC FQDN to resolve the IP address of MME 130(2). At 608, MME 130(1) receives, from DNS server 118, a DNS answer that includes the IP address of MME 130(2). The DNS answer may also include the service type of MME 130(2) (e.g., S10).

At 610, MME 130(2) obtains a GTPv2-C Forward Relocation Request from MME 130(1). The GTPv2-C Context Response may include an indication that the SGW of CUPS GW 125(1) is co-located with the PGW of CUPS GW 125(1) (e.g., a CCGWI set to '1'). The GTPv2-C Forward Relocation Request may also include EMM and ESM context information such as an identification of the SGW (e.g., SGW-C) and PGW (e.g., PGW-C) of CUPS GW 125(1) (e.g., a F-TEID including an IP address of the SGW and PGW of CUPS GW 125(1)). At 612, MME 130(2) sends a GTPv2-C Forward Relocation Response to MME 130(1).

At 614, MME 130(2) sends a DNS NAPTR query that includes the TAI FQDN of eNodeB 120(2) to DNS server 118 to resolve one or more IP addresses of one or more SGWs based on the TAI FQDN. At 616, DNS server 118 determines that multiple candidate SGWs are reachable from MME 130(2) for the TAI. At 618, MME 130(2) obtains, from DNS server 118, a DNS answer including identifications (e.g., IP addresses) of the candidate SGWs. At 620, MME 130(2) determines whether one of the IP addresses of the candidate SGWs matches the IP address of the SGW of CUPS GW 125(1) (e.g., whether the SGW is reachable from MME 130(2)). Operations 622-628 are performed if MME 130(2) determines that one of the IP addresses of the candidate SGWs matches the IP address of the SGW of CUPS GW 125(1), and operations 630-640 are performed if MME 130(2) determines that one of the IP addresses of the candidate SGWs does not match the IP address of the SGW of CUPS GW 125(1).

Turning first to operations 622-628, if MME 130(2) determines that one of the IP addresses of the candidate SGWs matches the IP address of the SGW of CUPS GW 125(1), at 622 MME 130(2) selects the SGW of CUPS GW 125(1) to host the PDN session after UE 105 transitions from MME 130(1) to MME 130(2). That is, MME 130(2) avoids SGW relocation and both PGW-C and SGW-C calls are kept intact in CUPS GW 125(1). At 624, MME 130(2) and CUPS GW 125(1) exchange Modify Bearer Request/Response messages. The Modify Bearer Request may update the F-TEID, and may include an IP address of the SGW of CUPS GW 125(1) and other information. At 626, MME 130(2) sends a GTPv2-C Forward Relocation Complete message to MME 130(1). The GTPv2-C Forward Relocation Complete message may include a SGWCI indicator flag set to '0' to indicate that the SGW for the PDN session is not changing. At 628, the handover procedure is completed, and the PDN session is retained in CUPS GW 125(1).

If MME 130(2) determines that none of the IP addresses of the candidate SGWs match the IP address of the SGW of CUPS GW 125(1), at 630 MME 130(2) performs SGW relocation by selecting the SGW of CUPS GW 125(2) to host the PDN session after UE 105 transitions from MME 130(1) to MME 130(2). That is, a session split is created whereby the PDN session is hosted by the PGW-C and PGW-U of CUPS GW 125(1), and by the SGW-C and SGW-U of CUPS GW 125(2). At 632, MME 130(2) and CUPS GW 125(2) exchange Create Session Request/Response messages. At 634, CUPS GW 125(1) and CUPS GW 125(2) exchange Modify Bearer Request/Response messages. At 636, MME 130(2) sends a GTPv2-C Forward Relocation Complete message to MME 130(1). The GTPv2-C Forward Relocation Complete message may include a SGWCI indicator flag set to '1' to indicate that the SGW for the PDN session is changing. At 638, MME 130(1) and CUPS GW 125(1) exchange Delete Session Request/Response messages to delete the existing SGW session. At 640, the handover procedure is completed, and the SGW-C and PGW-C sessions are split across CUPS GWs 125(1) and 125(2).

Figure 7:
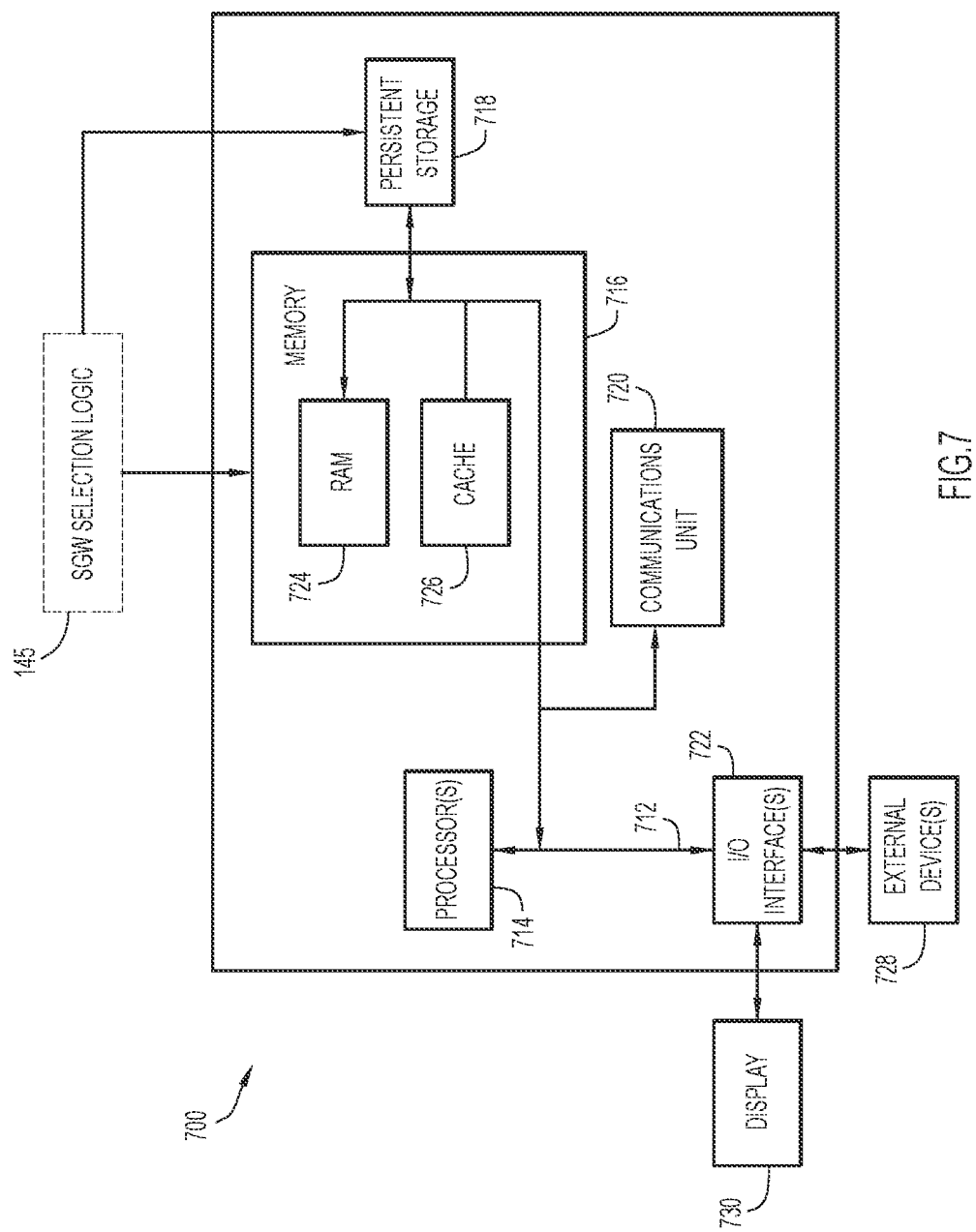
FIG. 7 illustrates a block diagram of a computing device configured to optimize SGW selection during inter-MME mobility scenarios, according to an example embodiment.

FIG. 7 illustrates a hardware block diagram of an example device 700 (e.g., a server that comprises an MME such as MME 130(2)). It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and Input/Output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes Random Access Memory (RAM) 724 and cache memory 726. In general, memory 716 can include any suitable volatile or non-volatile computer readable storage media. Instructions for SGW selection logic 145 may be stored in memory 716 or persistent storage 718 for execution by computer processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to device 700. For example, I/O interface(s) 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

Figure 8:
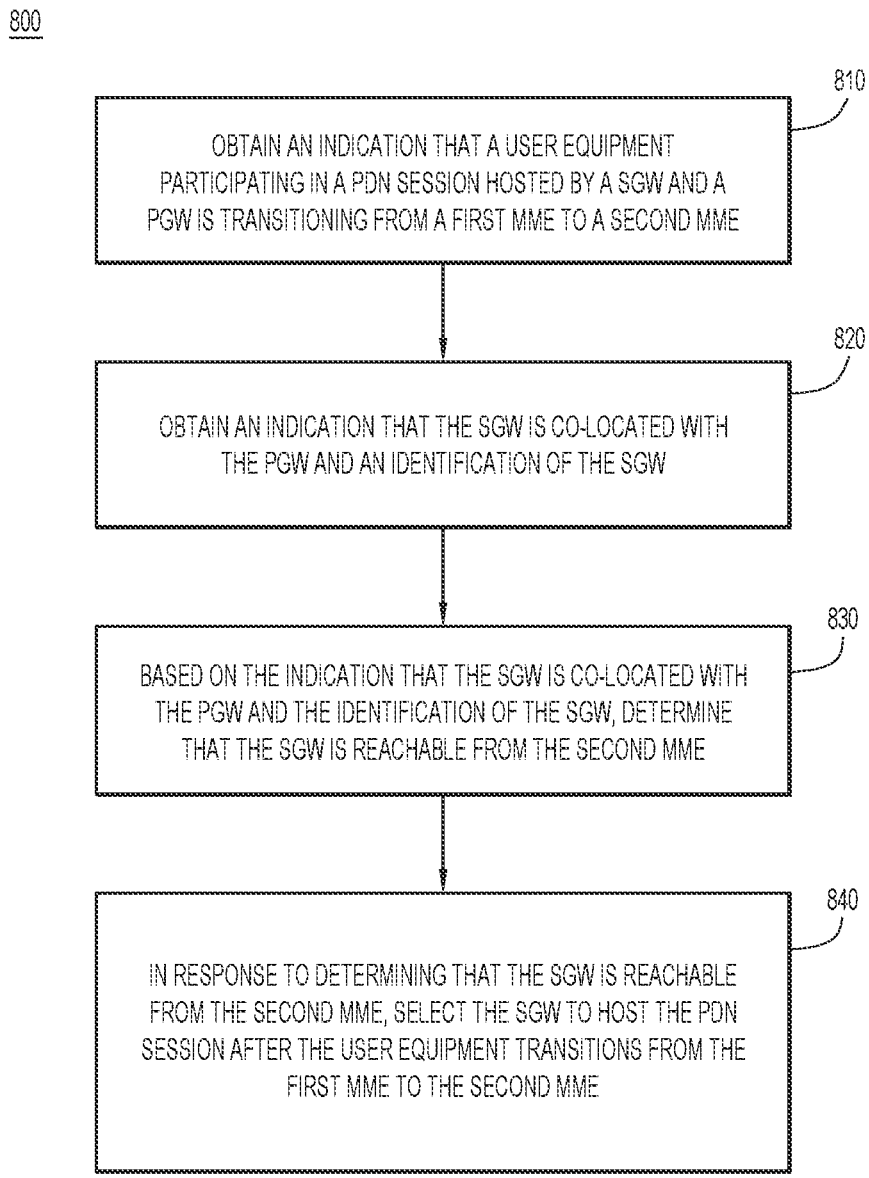
FIG. 8 illustrates a flowchart of a generalized method for optimizing SGW selection during inter-MME mobility scenarios, according to an example embodiment.

FIG. 8 is a flowchart of an example method 800 for optimizing SGW selection during inter-MME mobility scenarios. At 810, an indication that a user equipment participating in a PDN session hosted by a SGW and a PGW is transitioning from a first MME to a second MME is obtained. At 820, an indication that the SGW is co-located with the PGW and an identification of the SGW are obtained. At 830, based on the indication that the SGW is co-located with the PGW and the identification of the SGW, it is determined that the SGW is reachable from the second MME. At 840, in response to determining that the SGW is reachable from the second MME, the SGW is selected to host the PDN session after the user equipment transitions from the first MME to the second MME.

As described herein, an indication may be provided to a multiplicity of MMES in subsequent handover/TAU messages for a previously selected combination of SGW-C and PGW-C. These techniques provide signaling benefits within the network, particularly when the subscriber frequently moves from one geographical area to another. This solution may be especially effective in an overlapping or boundary area coverage condition. Additional signaling and data-plane processing hops may be avoided, thereby improving operational efficiency and reducing call processing latency in an end-to-end network path. A seamless inter-MME subscriber mobility experience may be provided (using an S10 interface) in a CUPS GW based Evolved Packet Core (EPC) architecture. These signaling benefits may be provided in a multi-vendor EPC/CUPS network environment.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining an indication that a user equipment participating in a Packet Data Network (PDN) session hosted by a Serving Gateway (SGW) and a PDN Gateway (PGW) is transitioning from a first Mobility Management Entity (MME) to a second MME; obtaining an indication that the SGW is co-located with the PGW and an identification of the SGW; based on the indication that the SGW is co-located with the PGW and the identification of the SGW, determining that the SGW is reachable from the second MME; and in response to determining that the SGW is reachable from the second MME, selecting the SGW to host the PDN session after the user equipment transitions from the first MME to the second MME.

In one example, obtaining the indication that the SGW is co-located with the PGW includes obtaining a flag indicating that the SGW is co-located with the PGW.

In one example, obtaining the indication that the SGW is co-located with the PGW includes obtaining a context response during a tracking area update procedure of the user equipment.

In one example, obtaining the indication that the SGW is co-located with the PGW includes obtaining a forward relocation request during a handover procedure of the user equipment.

In one example, determining that the SGW is reachable from the second MME includes: obtaining one or more identifications of candidate SGWs that are reachable from the second MME; and determining that one of the one or more identifications of candidate SGWs matches the identification of the SGW.

In one example, the indication that the SGW is co-located with the PGW is obtained by the first MME during an initial PDN connection of the user equipment. In a further example, the indication that the SGW is co-located with the PGW obtained by the first MME comprises a flag indicating that the SGW is co-located with the PGW included in a create session response.

In another form, an apparatus is provided. The apparatus comprises: a network interface configured to obtain or provide network communications; and one or more processors coupled to the network interface, wherein the one or more processors are configured to: obtain an indication that a user equipment participating in a Packet Data Network (PDN) session hosted by a Serving Gateway (SGW) and a PDN Gateway (PGW) is transitioning from an first Mobility Management Entity (MME) to a second MME; obtain an indication that the SGW is co-located with the PGW and an identification of the SGW; based on the indication that the SGW is co-located with the PGW and the identification of the SGW, determine that the SGW is reachable from the second MME; and in response to determining that the SGW is reachable from the second MME, select the SGW to host the PDN session after the user equipment transitions from the first MME to the second MME.

In another form, one or more non-transitory computer readable storage media are provided. The non-transitory computer readable storage media are encoded with instructions that, when executed by a processor, cause the processor to: obtain an indication that a user equipment participating in a Packet Data Network (PDN) session hosted by a Serving Gateway (SGW) and a PDN Gateway (PGW) is transitioning from a first Mobility Management Entity (MME) to a second MME; obtain an indication that the SGW is co-located with the PGW and an identification of the SGW; based on the indication that the SGW is co-located with the PGW and the identification of the SGW, determine that the SGW is reachable from the second MME; and in response to determining that the SGW is reachable from the second MME, select the SGW to host the PDN session after the user equipment transitions from the first MME to the second MME.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    obtaining an indication that a user equipment participating in a Packet Data Network (PDN) session hosted by a Serving Gateway (SGW) and a PDN Gateway (PGW) is transitioning from a first Mobility Management Entity (MME) to a second MME;
    obtaining an indication that the SGW is co-located with the PGW and an identification of the SGW;
    based on the indication that the SGW is co-located with the PGW and the identification of the SGW, determining that one of one or more identifications of candidate SGWs matches the identification of the SGW; and
    in response to determining that the one of the one or more identifications of the candidate SGWs matches the identification of the SGW, selecting the SGW to host the PDN session after the user equipment transitions from the first MME to the second MME.

2. The method of claim 1, wherein obtaining the indication that the SGW is co-located with the PGW includes obtaining a flag indicating that the SGW is co-located with the PGW.

3. The method of claim 1, wherein obtaining the indication that the SGW is co-located with the PGW includes obtaining a context response during a tracking area update procedure of the user equipment.

4. The method of claim 1, wherein obtaining the indication that the SGW is co-located with the PGW includes obtaining a forward relocation request during a handover procedure of the user equipment.

5. The method of claim 1, further comprising:
    obtaining the one or more identifications of the candidate SGWs, wherein the one or more identifications of the candidate SGWs are reachable from the second MME.

6. The method of claim 1, wherein the indication that the SGW is co-located with the PGW is obtained by the first MME during an initial PDN connection of the user equipment.

7. The method of claim 6, wherein the indication that the SGW is co-located with the PGW obtained by the first MME comprises a flag indicating that the SGW is co-located with the PGW included in a create session response.

8. An apparatus comprising:
    a network interface configured to obtain or provide network communications; and
    one or more processors coupled to the network interface, wherein the one or more processors are configured to:
    obtain an indication that a user equipment participating in a Packet Data Network (PDN) session hosted by a Serving Gateway (SGW) and a PDN Gateway (PGW) is transitioning from a first Mobility Management Entity (MME) to a second MME;
    obtain an indication that the SGW is co-located with the PGW and an identification of the SGW;
    based on the indication that the SGW is co-located with the PGW and the identification of the SGW, determine that one of one or more identifications of candidate SGWs matches the identification of the SGW; and in response to determining that the one of the one or more identifications of the candidate SGWs matches the identification of the SGW, select the SGW to host the PDN session after the user equipment transitions from the first MME to the second MME.

9. The apparatus of claim 8, wherein the one or more processors are further configured to:
obtain a flag indicating that the SGW is co-located with the PGW.

10. The apparatus of claim 8, wherein the one or more processors are further configured to:
obtain a context response during a tracking area update procedure of the user equipment.

11. The apparatus of claim 8, wherein the one or more processors are further configured to:
obtain a forward relocation request during a handover procedure of the user equipment.

12. The apparatus of claim 8, wherein the one or more processors are further configured to:
obtain the one or more identifications of the candidate SGWs, wherein the one or more identifications of the candidate SGWs are reachable from the second MME.

13. The apparatus of claim 8, wherein the indication that the SGW is co-located with the PGW is obtained by the first MME during an initial PDN connection of the user equipment.

14. The apparatus of claim 13, wherein the indication that the SGW is co-located with the PGW obtained by the first MME comprises a flag indicating that the SGW is co-located with the PGW included in a create session response.

15. One or more non-transitory computer readable storage media encoded with instructions that, when executed by a processor, cause the processor to:
obtain an indication that a user equipment participating in a Packet Data Network (PDN) session hosted by a Serving Gateway (SGW) and a PDN Gateway (PGW) is transitioning from an first Mobility Management Entity (MME) to a second MME;
obtain an indication that the SGW is co-located with the PGW and an identification of the SGW;
based on the indication that the SGW is co-located with the PGW and the identification of the SGW, determine that one of one or more identifications of candidate SGWs matches the identification of the SGW; and
in response to determining that the one of the one or more identifications of the candidate SGWs matches the identification of the SGW, select the SGW to host the PDN session after the user equipment transitions from the first MME to the second MME.

16. The one or more non-transitory computer readable storage media of claim 15, wherein the instructions further cause the processor to:
obtain a flag indicating that the SGW is co-located with the PGW.

17. The one or more non-transitory computer readable storage media of claim 15, wherein the instructions further cause the processor to:
obtain a context response during a tracking area update procedure of the user equipment.

18. The one or more non-transitory computer readable storage media of claim 15, wherein the instructions further cause the processor to:
obtain a forward relocation request during a handover procedure of the user equipment.

19. The one or more non-transitory computer readable storage media of claim 15, wherein the instructions further cause the processor to:
obtain the one or more identifications of the candidate SGWs, wherein the one or more identifications of the candidate SGWs are reachable from the second MME.

20. The one or more non-transitory computer readable storage media of claim 15, wherein the indication that the SGW is co-located with the PGW is obtained by the first MME during an initial PDN connection of the user equipment, and wherein the indication that the SGW is co-located with the PGW obtained by the first MME comprises a flag indicating that the SGW is co-located with the PGW included in a create session response.

* * * * *